United States Patent
Parsons et al.

(10) Patent No.: US 8,119,179 B2
(45) Date of Patent: Feb. 21, 2012

(54) GRAIN-BASED FOOD PRODUCT WITH POWDER COATING

(75) Inventors: Marcus Parsons, Crystal Lake, IL (US); Karen M. Lewis, Arlington Heights, IL (US)

(73) Assignee: The Quaker Oats Company, Chicago, IL (US)

( * ) Notice: Subject to any disclaimer, the term of this patent is extended or adjusted under 35 U.S.C. 154(b) by 0 days.

(21) Appl. No.: 13/009,950

(22) Filed: Jan. 20, 2011

(65) Prior Publication Data

US 2011/0111096 A1    May 12, 2011

Related U.S. Application Data

(62) Division of application No. 11/528,745, filed on Sep. 28, 2006, now Pat. No. 8,029,835.

(51) Int. Cl.
*A23L 1/164* (2006.01)
(52) U.S. Cl. ......... 426/292; 426/293; 426/620; 426/561
(58) Field of Classification Search .................. 426/293, 426/292, 620, 561
See application file for complete search history.

(56) References Cited

U.S. PATENT DOCUMENTS

| | | | |
|---|---|---|---|
| 3,784,716 A | 1/1974 | Spangler | |
| 4,289,794 A | 9/1981 | Kleiner et al. | |
| 4,379,171 A | 4/1983 | Furda et al. | |
| 4,755,390 A | 7/1988 | Calandro et al. | |
| 4,853,235 A | 8/1989 | Tomomatsu | |
| 5,270,063 A | 12/1993 | Wullschleger et al. | |
| 5,298,268 A | 3/1994 | Maegli | |
| 5,827,553 A | 10/1998 | Dimitroglou et al. | |
| 5,894,027 A | 4/1999 | Kazemzadeh | |
| 6,120,821 A | 9/2000 | Goodin et al. | |
| 6,168,811 B1 | 1/2001 | Clark et al. | |
| 6,270,818 B1 | 8/2001 | Manoski et al. | |
| 6,479,085 B1 | 11/2002 | Archibald | |
| 6,495,179 B1 | 12/2002 | Zietlow et al. | |
| 6,514,549 B1 | 2/2003 | Hertz et al. | |
| 6,610,335 B2 | 8/2003 | Hansa et al. | |
| 7,648,722 B2 | 1/2010 | Farinella et al. | |
| 2002/0058089 A1 | 5/2002 | Burri et al. | |
| 2003/0099742 A1 | 5/2003 | Hansa et al. | |

(Continued)

FOREIGN PATENT DOCUMENTS

DE    20 2006 004 097    8/2006

(Continued)

OTHER PUBLICATIONS

Lempert, Phil, "The Scoop on Cereals," Mar. 14, 2001, http://archive.supermarketguru.com/page.cfm/286, pp. 1-5.

(Continued)

*Primary Examiner* — Kelly Bekker
(74) *Attorney, Agent, or Firm* — Banner & Witcoff, Ltd.

(57) ABSTRACT

A grain-based food product comprising a grain-based component covered by a moisture-sensitive powder layer and a binding layer adhering the powder layer to the grain-based component. The binding layer is chosen so that the powder layer can later disperse into a liquid that is added just prior to consumption. The powder layer comprises a component of interest to make the product more interesting to consume. For example, the component of interest can be chosen to produce a difference in color, appearance, texture or flavor of the food product in the presence of a liquid, such as milk or water.

14 Claims, 2 Drawing Sheets

U.S. PATENT DOCUMENTS

| | | |
|---|---|---|
| 2005/0003055 A1 | 1/2005 | Baydo et al. |
| 2005/0255218 A1* | 11/2005 | Green et al. .................. 426/619 |
| 2006/0204625 A1 | 9/2006 | Woelfel |
| 2008/0081099 A1 | 4/2008 | Parsons et al. |
| 2008/0268132 A1 | 10/2008 | Hansa |

FOREIGN PATENT DOCUMENTS

| | | |
|---|---|---|
| EP | 1447011 | 8/2004 |
| GB | 1327350 | 8/1973 |
| WO | 98/15194 | 4/1998 |
| WO | 99/02043 | 1/1999 |
| WO | 01/60177 | 8/2001 |
| WO | 02/091864 | 11/2002 |
| WO | 2006/127032 | 11/2006 |

OTHER PUBLICATIONS

Definition of 'candy' retrieved Jun. 11, 2010 on http://wordnetweb.princeton.edu, p. 1.

Definition of 'candy bar' retrieved Jun. 11, 2010 on http://wordnetweb.princeton.edu, p. 1.1.

Definition of 'cereal' retrieved Jun. 11, 2010 on http://wordnetweb.princeton.edu, p. 1.

Definition of 'candy' retrieved Jun. 11, 2010 on http://www.epicurious.com, p. 1.

Definition of 'cereal' retrieved Jun. 11, 2010 on http://www.epicurious.com, p. 1.

Food and Nutrition Information Center, "Food Dictionaries and Encyclopedia," retrieved Jun. 11, 2010 on http://fnic.nal.usda.gov, p. 1.

Definition of 'candy bar' retrieved Jun. 11, 2010 on http://dictionary.sensagent.com, pp. 1-10.

"Define: cereal," retrieved Jun. 11, 2010 on http://www.google.com/search, pp. 1-2.

Definition of 'particulate' retrieved Jul. 15, 2010 on http://www.thefreedictionary.com/p/particulate, pp. 1-2.

Definition of 'particulate' retrieved Jul. 15, 2010 on http://wordnetweb.princeton.edu, p. 1.

Definition of 'bar' retrieved Jul. 15, 2010 on http://www.merriam-webster.com/dictionary/bar, pp. 1-2.

Fast et al., "Breakfast Cereals and How They are Made," American Association of Cereal Chemists, 1990, p. 218-219.

Hiu et al., "Dictionary of Food Ingredients," Third Edition, Chapman and Hall, 1996, p. 66-67.

"Burning Question: How Does Popping Candy Work?" retrieved on Jan. 19, 2011 on http://www.yumsugar.com/Burning-Question-How-Does-Popping-Candy-Work-2329177, shared Oct. 9, 2008 p. 1.

"Pop Rocks Candy History," retrieved on Jan. 19, 2011 on http://www.poprockscandy.com/history.html, pp. 1-2.

\* cited by examiner

GRAIN-BASED FOOD PRODUCT WITH POWDER COATING

CROSS REFERENCE TO RELATED APPLICATION

This application is a divisional of U.S. patent application Ser. No. 11/528,745, filed Sep. 28, 2006, now U.S. Pat. No. 8,029,835, the contents of which are incorporated herein by reference in their entirety.

FIELD OF THE INVENTION

The present invention relates generally to grain-based food products with powder coatings, and methods of making such food products.

BACKGROUND OF THE INVENTION

For many years, grain-based food products have been a staple of the human diet. Popular grain-based food products include, for example, cold breakfast cereal (ready-to eat or "RTE cereal"), hot cereal, oatmeal or grits. Such grain-based products are commonly viewed as health foods, providing a rich source of nutrients and fiber.

With a growing interest in cereal and other grain-based products for its health benefits, it would be desirable to provide a grain-based food product that combines convenience and health attributes with added value, such as additional sensory appeal, texture, nutritional value or other attributes that may be of interest to the consumers. This is especially important in view of the highly diverse tastes, interests, preferences and diet considerations of a growing consumer market. Sensory appeal, in particular, is important for increasing the popularity of such grain-based products among children.

As such, it is desirable to provide improved grain-based food products which have appealing sensory attributes, and a technological platform to make such products.

SUMMARY OF THE INVENTION

The invention relates to a grain-based food product. The grain-based food product includes a grain-based component coated with a moisture-sensitive powder layer, and a binding layer adhering the powder layer to the grain-based component. The binding layer is chosen so that the powder layer can later disperse into a liquid that is added just prior to consumption. The powder layer comprises a component of interest, which can be chosen to produce any of a variety of attributes, including color and appearance, texture or flavor of the food product in the presence of a liquid, such as milk or water. The component of interest includes, but is not limited to, a fizz powder mix, flavorings, coloring agents, probiotic microorganisms, cocoa, sugar, mint, glitter, small particles of gel-like pieces, chocolate shavings, small pieces of dehydrated fruit, nuts, or mixtures thereof. Providing such components of interest enhances the experience of eating an otherwise nutritious and tasty grain-based food product or cereal.

These and other objects, along with advantages and features of the present invention herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION OF THE INVENTION

Figure 1:
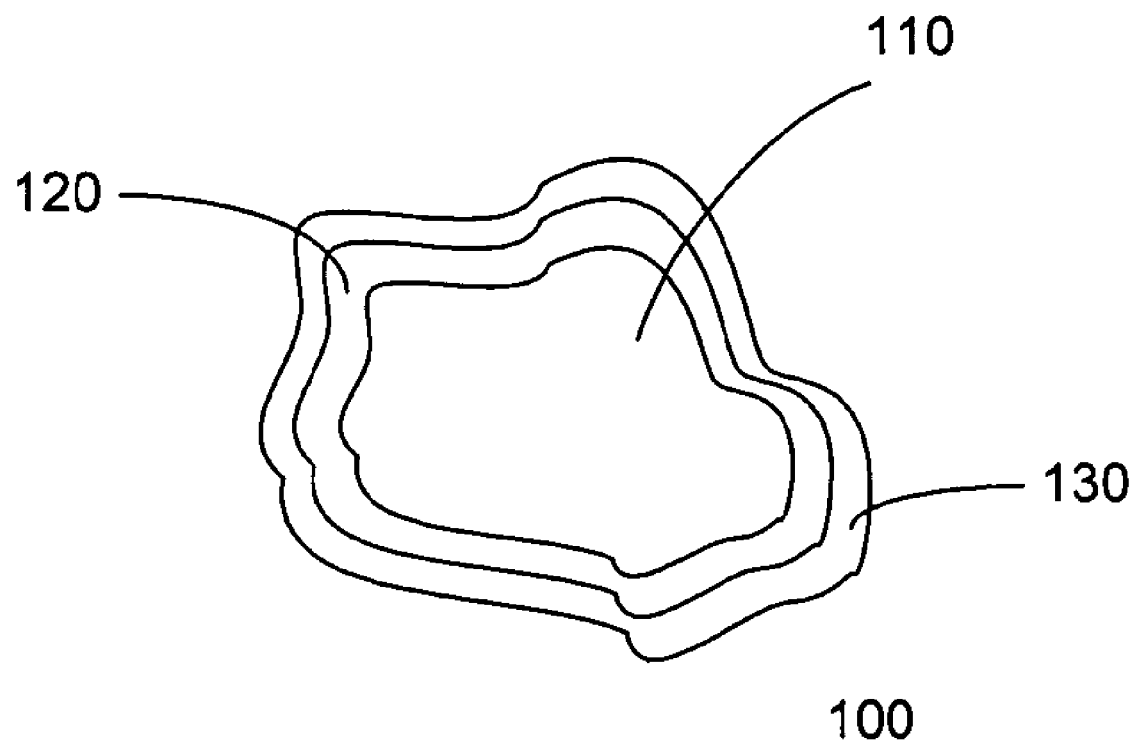
FIG. 1 shows a food product in one embodiment of the invention.

FIG. 1 shows a food product 100, in accordance with one embodiment of the invention. The food product comprises a base product 110. The base product 110 can comprise a grain-based component. The grain-based component comprises, for example, cereal, oats, rice, grits, barley, granola, corn, potato, tapioca, starch extrudates, wheat, buckwheat, millet, rye or a combination thereof (e.g., multi-grain). Other types of grains are also useful. The grain-based component can comprise a hot cereal product or a cold cereal product. Ingredients, including but not limited to sweeteners, flavorings, colorings, vitamins, minerals and preservatives can be added as desired as part of the grain-based component formulation.

In one embodiment, the grain-based component comprises an instant hot cereal-based product, such as instant oatmeal, instant grits, instant barley, or a combination thereof. Other types of instant hot cereal or instant food products are also useful. The instant cereal is prepared by the addition of liquid, such as water. Preparing the instant cereal by adding other types of liquid, such as milk, may also be useful. Typically, the liquid is added at a temperature close to its boiling point. Other temperatures may also be useful, depending on the types of cereal or food product. Adding liquid and then heating the cereal in a micro-wave oven is also useful. Non-instant types of cereals or food products are also useful. Such types of cereals or food products are prepared by adding liquid and cooking the mixture.

In one embodiment, the grain-based component is a ready-to-eat ("RTE") cereal piece. The RTE cereal piece can be a bare piece, or can comprise conventional coatings. For example, the RTE base piece 110 can be pre-coated with a glaze, such as a sugar glaze, to form a first, or bottom layer, of sensory interest. Additional ingredients, such as sweeteners, flavorings, colorings, vitamins, minerals, preservatives can be incorporated into the RTE base piece, as desired.

The base product 110 is covered by a binding layer 120. The binding layer 120 acts as a binding agent to adhere a subsequently applied powder layer 130 to the base product. Preferably, the type and amount of binding layer are chosen to provide adequate adhesion of the powder layer 130 without imparting any off-flavor to the food product. The binding layer is also chosen to allow the powder layer 130 to disperse (i.e., to effect the release of the powder layer) into the desired liquid (e.g., water and milk).

The binding layer preferably comprises a material that does not dissolve the components of the powder layer. For example, in the embodiment where the powder layer comprises a moisture-sensitive material, the binding layer is preferably non-aqueous, to prevent the moisture sensitive powder from dissolving into the binding layer, or moisture from migrating into the moisture sensitive powder from the binding layer. Also, the binding layer material typically does not dry out and is not film-forming. In one embodiment, the binding layer comprises oils or fats, including cocoa butter, coconut oil, vegetable oils such as palm, soybean, cottonseed, corn and mixtures thereof. Preferably, the binding layer comprises glycerin (i.e. glycerol) or propylene glycol. A suitable amount of glycerin ranges generally from about 0.5% to about 10% of the total weight (wt) of the final food product, and preferably from about 3% to about 7%. Other types of materials can also be used to form the binding layer. Non-limiting examples include but are not limited to propylene glycol, glycerol esters, polysorbates, polyglycerol esters of fatty acids, solutions of sugar in glycerol, or a combination thereof.

Once the base product 110 is covered with the binding layer 120, a powder layer 130 is applied. In one embodiment, the powder layer 130 comprises a component of interest. The component of interest can be chosen to produce a desired effect, such as a change in color, appearance, texture, aroma or flavor of the food product in the presence of a liquid. The component of interest can also be chosen to add nutritional value to the final food product. The component of interest is preferably moisture-sensitive, water-soluble or water-dispersible, so that when the final food product is mixed with a desired liquid prior to consumption, the desired effect is created to enhance the eating experience. Non-limiting examples of components of interest for use in the powder layer 130 include, for example, a fizz powder mix, flavorings, coloring agents, probiotic microorganisms, cocoa, sugar, mint, glitter, small particles of gel-like pieces, chocolate shavings, small pieces of dehydrated fruit, nuts, or mixtures thereof. The amount of component of interest will vary depending on the component itself, and the design of the food product.

The particulate size of the ingredients that make up the powder layer is selected, for example, to ensure good adhesion to and surface coverage of the base product, to obtain the desired rates of dispersion and dissolution when subjected to liquid, to avoid grittiness, among other reasons. If particle size is too large, and the dissolution rate may be too low, for example, and the powder layer may impart an undesirable gritty texture to the cereal, or remain at the bottom of the cereal bowl after the cereal has been consumed. Smaller particles generally provide better adhesion and surface coverage of the base product. In addition, higher dissolution rates and reaction rates are achieved with smaller particles. Particle sizes of the various ingredients that comprise the powder layer 130 will vary depending upon the nature of the ingredients, the desired rate of dispersion and dissolution, mouthfeel, and other characteristics.

In one embodiment, the component of interest comprises a moisture-sensitive material that reacts, dissolves or disperses in a liquid. For example, the component of interest can comprise a fizz powder that reacts when contacted with a liquid (e.g., water or milk), to form fizz and/or foam. In one embodiment, the fizz powder composition comprises an acid component and a base component that react with each other when introduced into milk or some other liquid prior to consumption. In one embodiment, the acid component comprises an acid, such as citric acid, tartaric, malic, fumaric or adipic acids, or a combination thereof. Preferably, the acid component comprises citric acid. Other edible or food compatible acids may also be useful, for example acetic acid or other food grade acids. The base component comprises, in one embodiment, a carbonate or bicarbonate. Any edible carbonate or bicarbonate that reacts with the acid component to form carbon dioxide can be used. Typical carbonates or bicarbonate are of sodium, sodium hydrogen, potassium, potassium hydrogen, calcium, ammonium, or mixtures thereof. Preferably, the base component comprises calcium carbonate, sodium bicarbonate or a combination thereof. Other edible or food compatible bases may also be useful. These ingredients will create fizzing and foam upon the addition of liquid to the food product. The fizzing and foam, caused by the release of carbon dioxide, creates a sensory perception that is especially appealing to children.

In one embodiment, the fizz powder composition comprises about 30-70% by weight of the acid component and about 30-70% by weight of the base component. Preferably, the fizz composition comprises about 50 wt % of the acid component and about 50 wt % of the base component. Other compositional ranges may also be useful. For example, the amount of acid component can be about 0 to 20 wt % in excess of the amount needed to release all the carbon dioxide from the base component.

The food product preferably comprises a sufficient amount of fizz powder to cause fizzing when an aqueous liquid is added to it. For example, the amount of fizz powder can be sufficient to produce build fizz for about 10 seconds to provide initial attraction or entertainment and then remain airy and/or fizzy for the duration of consumption for a unique mouthfeel. Other fizz durations can also be useful. Preferably, the amount of fizz powder is below the level which would adversely impact taste caused by the salt formed during the reaction. It may also be desirable to provide the fizz powder at levels which do not impart a substantial degree of carbonation to the aqueous liquid. In one embodiment, the fizz composition comprises about 1% to 40% by weight of the final product. Preferably, the fizz composition comprises about 25% by weight of the final product. Other percentages of fizz composition may also be useful.

In one embodiment, the powder layer comprises a flavoring composition. The flavoring composition disperses and/or dissolves to provide flavor when the food product is subjected to a liquid. The flavoring composition can comprise, for example, flavors such as chocolate, vanilla, menthol, fruit, peanut butter, or a combination thereof. The flavors can be natural or artificial flavors, with or without carriers. Often such flavorants are effective in very low quantities. The flavors can also be provided by bulk ingredients such as cocoa powders, chocolate shavings, or other more bulky ingredients. The flavoring composition can disperse and/or dissolve in a liquid, such as milk, which has been added to the food product 100, to form flavored milk. In one embodiment, the flavoring composition comprises chocolate-flavored or cocoa powder. A sufficient amount of chocolate or cocoa powder can be provided to disperse and/or in added milk to convert it to chocolate milk.

The flavoring in the powder layer 130 can be chosen to contrast with any flavoring used in making the base component 110 (e.g., RTE cereal piece). Alternatively, the flavoring can be chosen to supplement any flavor of the base component. Any flavoring can be used. For example, menthol or mint flavoring can be included in the flavoring composition to generate an initial burst of flavor or cooling effect in the mouth. This can be combined with a separate or distinct flavor in the grain-based product (e.g., sugar syrup flavor) to provide a dual-flavored effect. The types and amounts of flavorings can vary depending on the effect desired and the product design. Also, the flavoring can be added in a variety of forms, such as in a concentrated liquid, a powder, an encapsulated form, a chunk or shaving (e.g., chocolate shavings), or other forms, or combinations of forms. For example, the flavoring can be added in an encapsulated form (e.g., a gel or powder) to control the release of the flavor while the consumer chews the product.

In one embodiment, the powder layer comprises coloring agents, for example, natural or artificial dyes such as FD&C dyes. The powder layer can leave a swirl or streak of color in the cereal, enhancing its visual appeal. The powder layer can also comprise edible pearlescent compounds such as titanium dioxide platelets and micaceous based pearlescent pigments, or edible glitter.

In another embodiment, the powder layer comprises probiotic microorganisms to enhance digestive health. Such probiotic substances include *Bifidobacterium adolescentis, Bifidobacterium bifidum, Bifidobacterium anamalis, Bifidobacterium lactis, Bifidobacterium infantis, Bifidobacterium longum, Lactobacillus casei, Lactobacillus plantarum, Lactobacillus acidophilus, Lactobacillus brevis, Lactobacillus reuteri*. The powder layer can also comprise other nutritionally desirable ingredients such as enzymes, amino acids, vitamins, minerals, or a combination thereof.

In one embodiment, the powder layer comprises the component of interest admixed with a starch or a starch-like blend. The starch or starch-like blend serves to control the rate of dispersibility of the component of interest in the liquid. It has been found that the use of starch, instead of more water soluble powders, surprisingly provides for faster dispersion of the component of interest when the desired liquid (e.g., milk or water) is added to the food product. Dispersion of the component of interest, then, provides the unique or desired quality to the food product that makes it interesting to consume, hence providing a factor of differentiation over competitive products.

In one embodiment, the starch, preferably corn starch, is blended with other common ingredients, such as powdered sugar, flavorings, or other ingredients, to form a starch-like blend. Preferably, the starch-like blend comprises at least about 55% corn starch and up to about 45% powdered sugar. More preferably, the starch-like blend comprises about 65% corn starch and up to about 25% powdered sugar. Other optional ingredients, such as food coloring can be added to the starch blend. When added to the starch blend, the powdered sugar is preferably "12X" confectioners sugar.

Providing a higher amount of starch increases the rate of dispersibility. In the embodiment for use with fizz powder, the amount of starch can be adjusted to allow slower or more rapid release of the acid and base components into the liquid. A higher starch to powdered sugar ratio, for example, will release the acid and base more quickly than a lower starch to powdered sugar ratio. Slower release will prolong the fizzing experience. Faster release will allow the fizzing to occur more intensely, but over a shorter period of time. Furthermore, even after the active fizzing ceases, the milk, or other liquid, may stay aerated for an additional amount of time.

The powder layer 130 may vary generally from about 20% to about 30% by weight of the final food product piece of this invention. The base component 110 can be about 60% to about 80% by weight of the final product piece. The binding (e.g., glycerol) layer 120 can be about 0.5% by weight to about 10% by weight of the final product piece. The proportions of the various components may vary depending on product design and relative densities of the various ingredients and components of the final food product.

One advantage of this invention is that a common technological platform can be used to design grain-based products with a range of sensory, nutritional, or other attributes. A variety of different grain-based pieces can be combined with a variety of powder layers 130. Final proportions of the grain-based piece 110, the binding layer 120, and the powder layer 130 will depend on the sensory or nutritional qualities sought, and relative densities of the various ingredients and components that comprise the final food product. For example, a RTE base cereal piece with a relatively low density, such as puffed rice, may make up a lower percentage (by weight) of the final RTE product, than where a higher density RTE base cereal is used.

Additional layers of ingredients can also be incorporated into or onto the products of this invention. Also, the powder for forming the powder layer can be encapsulated with an encapsulating layer prior to application of the powder onto a liquid coated RTE piece, or other base products. As a further, non-limiting example, an RTE, with both a binding coating 120 and a powder layer 130 may be further coated with an additional binding or powder layer, so that the final RTE product has several binding and/or powder layers. The additional layers are not limited to any specific type of binding or powder layer. In other words, in addition to the binding coating 120 and the powder layer 130, any other coatings or layers can also be added, depending on product design. Furthermore, this invention is not limited to base pieces that are completely coated, as partial coatings, with exposed base pieces may also be desirable.

Also, where additional optional coatings are incorporated into the product design, the exact sequence of coatings can vary. Products can also be designed with several powder layers 130, having the same, or different, components of interest. One skilled in the art of food formulations will appreciate the flexibility in product design that teachings in this invention provide.

Figure 2:
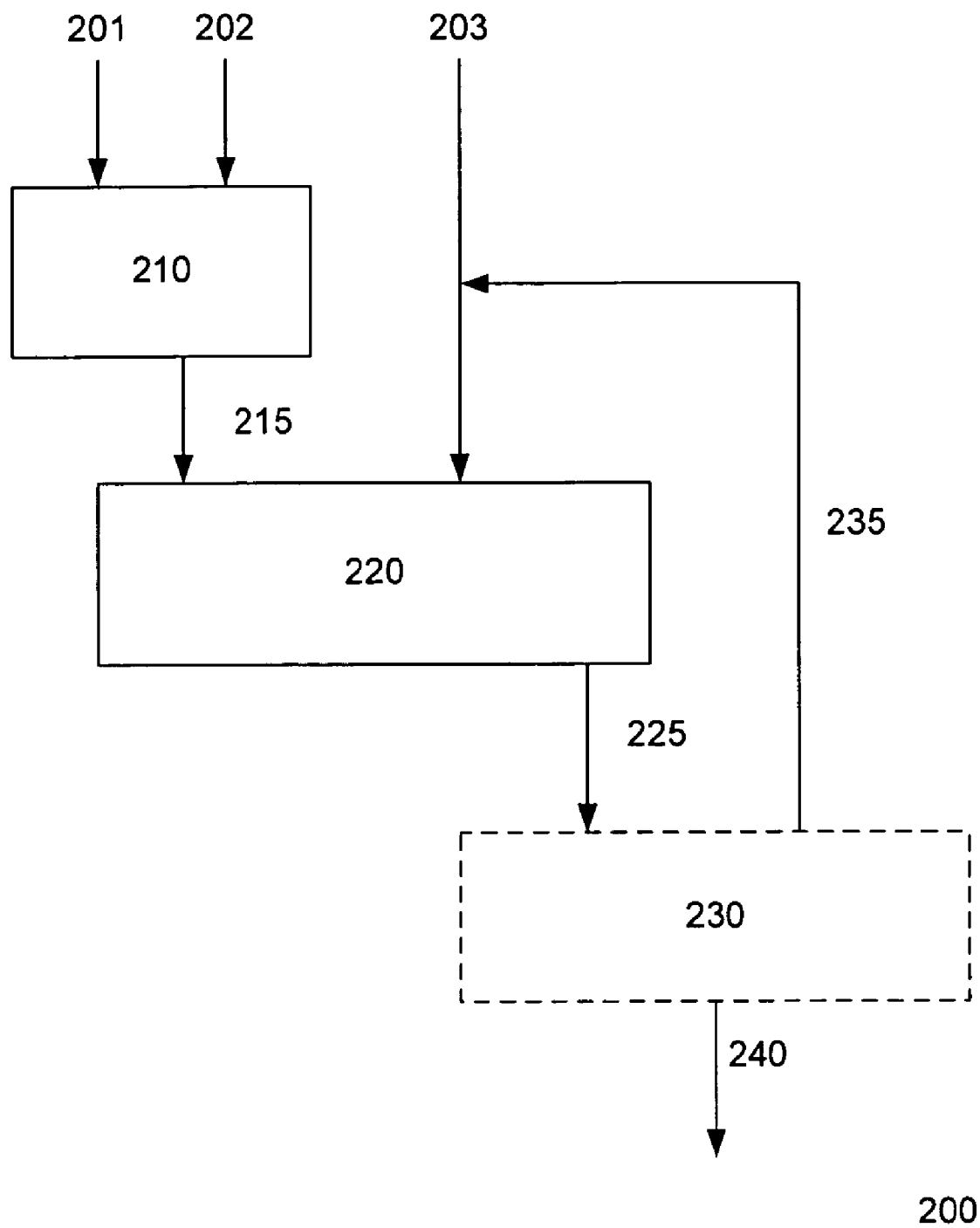
FIG. 2 shows a schematic diagram of a system for making the food product in one embodiment of the invention.

FIG. 2 shows a schematic diagram of a system 200 for making the food product in one embodiment of the invention. Base products 201 are coated with the binding material 202 in a first coating apparatus 210. The base products can comprise, in one embodiment, RTE cereal pieces. The RTE cereal pieces can be made by common methods known in the art, such as flaking, rolling, "shooting" grains from guns, extrusion or otherwise forming and baking cereal pieces from dough. RTE pieces are preferably dried to below about 15% moisture before further processing. RTE cereal pieces can then, optionally, be pre-coated with conventional sugar or fat-based glazes, which are typically applied to reduce porosity and to increase the flavor and bowl life, to form a pre-coated RTE piece. Once made, the RTE pieces (or the pre-coated RTE pieces) are coated with the binding material 202 and the powder material 203 taught by this invention. The coatings provide added interest to RTE cereals, with the further advantage that different coatings and final products can be produced using the same technological platform.

In one embodiment, the first coating apparatus 210 comprises, for example, a vertically oriented stationary drum. The binding material 202 is applied by atomizing the liquid binding material (e.g., glycerin) to form a "mist" in the stationary drum. The mist is sprayed onto the RTE cereal pieces as they spin and fall by gravity around a cone at the top of the drum and along its inner perimeter. Other suitable commercially available equipment are also useful.

The coated base RTE cereal pieces 215 are then transferred to another clean and dry (i.e. second) coating apparatus 220, in one embodiment. The second coating apparatus coats the cereal pieces with a powder material 203. When added, the powder layer adheres to the liquid coated RTE pieces by the previously applied binding material. The second coating apparatus 220 comprises, for example, a vibratory conveyor. Other types of coating apparatus, such as a coating screw or an enrober, are also useful. For example, a curtain of powder can be deposited onto the coated RTE pieces on a vibratory conveyor, where the vibratory action mixes the powder with the liquid coated RTE pieces. The powder-coated RTE pieces 225 may then optionally be transferred to a screen 230 to filter excess powder 235 to be re-circulated and re-used in the process. The final coated RTE cereal product 240 can then be packaged and loaded into cartons for distribution.

Alternatively, the powder material 203 can be applied in the same apparatus 210 as where the liquid coating 202 is applied. In such an embodiment, an enrober is preferably used, where the binding material is applied near the beginning of the enrober (the portion closest to the inlet), and the powder layer is introduced near the middle portion of the enrober. The RTE pieces can be conveyed through the enrober by a device that also mixes or tumbles the liquid coated RTE pieces and the powder layer, so that a final RTE piece is produced with a relatively uniform powder layer.

The following examples illustrate and explain the present invention but are not to be taken as limiting the present invention in any regard. As in the examples hereinafter, all parts are in parts by weight, all percents are in percents by weight, based on the weight of the material referred to.

Example 1

Cereal pieces are formed by extrusion, followed by coating with a sugar syrup, and drying to below 15% moisture. The cereal pieces are then placed in a mist coater and sprayed with a fine mist of glycerin. A fizz powder is applied as a powder layer onto the glycerin-coated cereal pieces. The fizz powder is prepared by mixing about 25% citric acid, 69% sodium bicarbonate, 1% color, and 5% dextrose and magnesium stearate. The final cereal piece comprises about 70% cereal, 5% glycerin and 25% fizz powder, but can vary from about 50-98.5% sugar coated cereal, 0.5-10% glycerin, and 1-40% fizz powder. When milk is added to the resulting cereal, it fizzes and foams for at least 10 seconds due to the release of carbon dioxide, and remains airy and fizzy for the duration of the eating experience.

Example 2

By the same method as described in Example 1, cereal pieces are subjected to a fine mist of glycerin. The glycerin-coated pieces are then coated with a chocolate-like powder comprising cocoa powder or a blend of cocoa powder containing sugars and flavorings. The final cereal pieces comprise about 86% cereal, 4% glycerin and 10% chocolate powder, but can vary from about 50-98.5% sugar coated cereal, 0.5-10% glycerin, and 1-40% cocoa powder. With the addition of milk prior to consumption, the chocolate powder disperses in the milk to produce chocolate milk to give a tasty and beautifully colored bowl of cereal.

While the invention has been particularly shown and described with reference to various embodiments, it will be recognized by those skilled in the art that modifications and changes may be made to the present invention without departing from the spirit and scope thereof. The scope of the invention should therefore be determined not with reference to the above description but with reference to the appended claims along with their full scope of equivalents.

What is claimed is:

1. A method of making a grain-based food product comprising:
   providing a grain-based ready-to-eat cereal consisting essentially of a composition selected from the group consisting of cereal, oats, rice, grits, barley, granola, corn, potato, tapioca, starch extrudates, wheat, buckwheat, millet, rye, other types of grains, and combinations thereof;
   applying a binding material selected from the group consisting of materials that do not form a film and do not dissolve the moisture-sensitive powder and blends thereof on at least part of the grain-based ready-to-eat cereal; and
   applying to the grain-based ready-to-eat cereal with the binding material a moisture-sensitive powder selected from the group consisting of fizz powder mix, and fizz powder mix blended with one or more components selected from the group consisting of flavoring compositions, probiotic microorganisms, cocoa, sugar, mint, glitter, small particles of gel-like pieces, chocolate pieces or shavings, small pieces of dehydrated fruit, nuts starch, and starch-like blends; wherein the fizz powder mix comprises an acid component and a base component which react in the presence of liquid to form fizz.

2. The method of claim 1 wherein applying the binding material comprises:
   atomizing a liquid binding material.

3. The method of claim 2 further comprising applying the atomized liquid while the grain-based component is falling.

4. The method of claim 2 wherein the binding material is applied in a first coating apparatus and the powder is applied in a second coating apparatus.

5. The method of claim 1 further comprising pre-coating the grain-based ready-to-eat cereal with a sugar glaze.

6. The method of claim 1 wherein the binding material comprises oils or fats.

7. The method of claim 1 wherein the binding material comprises glycerin, glycerol esters, polysorbates, polyglycerol esters of fatty acids, solutions of sugar in glycerol, propylene glycol, or a combination thereof.

8. The method of claim 1 wherein the moisture-sensitive powder is capable of producing a difference in color, appearance, texture, aroma, or flavor of the food product in the presence of a liquid.

9. The method of claim 1 wherein the acid component comprises citric acid, tartaric acid, malic acid, fumaric acid, adipic acid, or a combination thereof.

10. The method of claim 1 wherein the base component comprises a carbonate or bicarbonate.

11. The method of claim 10 wherein the carbonates or bicarbonates are of sodium, sodium hydrogen, potassium, potassium hydrogen, calcium, ammonium, or mixtures thereof.

12. The method of claim 1 wherein the fizz powder mix comprises from about 30% to about 70% by weight of the acid component and from about 30% to about 70% by weight of the base component.

13. The method of claim 12 wherein the fizz powder mix comprises about 50% by weight of the acid component and about 50% by weight of the base component.

14. The method of claim 1 wherein the moisture-sensitive powder comprises a starch or starch-like blend to allow the powder to disperse in a liquid.

* * * * *